United States Patent
Hartung

[19]

[11] 3,911,347

[45] Oct. 7, 1975

[54] ADAPTIVE CONTROL SYSTEM

[75] Inventor: Dudley B. Hartung, Somerville, Mass.

[73] Assignee: Xenex Corporation, Woburn, Mass.

[22] Filed: Oct. 9, 1973

[21] Appl. No.: 404,846

Related U.S. Application Data

[63] Continuation of Ser. No. 236,239, March 20, 1972.

[52] U.S. Cl. ............ 318/632; 318/655; 235/151.11
[51] Int. Cl. ......................................... G05d 23/275
[58] Field of Search ........ 318/632, 655; 235/151.11

[56] References Cited
UNITED STATES PATENTS

| | | | |
|---|---|---|---|
| 3,689,821 | 9/1972 | Slawson | 318/632 |
| 3,705,400 | 12/1972 | Cordes, Jr. | 318/632 X |
| 3,725,654 | 4/1973 | Tripp | 318/632 X |
| 3,757,188 | 9/1973 | Brewer | 318/632 |

*Primary Examiner*—B. Dobeck
*Attorney, Agent, or Firm*—Reising, Ethington & Perry

[57] ABSTRACT

An adaptive system is disclosed for controlling the motion of a member which makes successive excursions of a desired path. Dynamic errors which cause deviation from the path are reduced on successive excursions by developing and storing correction signals corresponding to given intervals during each excursion. The correction signal which was stored during one excursion for a given interval is combined with the corrected command signal for that interval during the next excursion.

15 Claims, 3 Drawing Figures

U.S. Patent   Oct. 7,1975   3,911,347

ADAPTIVE CONTROL SYSTEM

This is a continuation of application Ser. No. 236,239, filed Mar. 20, 1972.

This invention relates to control systems for automatic control of the motion of a member relative to a reference axis system and more particularly, the invention relates to adaptive or heuristic position control systems.

In the automatic control of the motion of a member such as a machine tool, there has remained the problem of causing the actual motion to conform to the desired motion to a high degree of accuracy. For example in the case of a machine tool of the contouring type, such as a profile milling machine operated by a numerical control system, two different types of errors may be isolated or, at least identified. In such a machine tool it is desired to cause the workpiece and cutting tool to move relatively so that the cutting tool effectively traverses a cut path on the workpiece. The cut path will invariably differ to some extent from the desired path which is defined by the command signals taken from the stored program or developed by the interpolator of the control system. One type of error which results in such deviation or departure may be termed the static error which arises from a lack of precision in the table or tool mechanisms such as the slides, ways and lead screws. The lack of precision may be manifested in lack of straightness or nonlinearity of relationship in such elements. Such static errors in the machine tools are repeatable and can be compensated in various ways to reduce the errors to a tolerable level. For example a calibration chart may be developed for each axis which indicates the error or deviation value at an arbitrarily selected number of positions along the axis. It has been proposed in the prior art to effect such compensation automatically in the use of the machine. In a pulse counting numerical control system a signal modifier is connected to add or substract a predetermined number of pulses to compensate the errors in accordance with the position of the movable member of the machine tool. It has also been proposed to effect compensation for such errors in computerized control of a machine member by storing a table of error correction values in a memory device corresponding to different points in the field of movement of the controlled member and to modify the command signals by the correction values in accordance with the position of the controlled member. Such prior art systems are useful for correcting the so called static errors but are ineffective to eliminate or reduce a second type of error which may be termed dynamic error, and which arises from and varies with the dynamic operating conditions of the machine. It is known, for example, that the cut path produced by a given machine tool will deviate differently from the desired path when the feedrate is changed, even though all other operating parameters are the same. The difference or change in the deviation as one or more operating parameters are changed arises from such factors as nonlinearities in the servo system and the dynamic properties of the machine tool, such as hysteresis and spring constants of the members. Such dynamic errors have been particularly troublesome and difficult to correct and have imposed severe limitations on the practical uses of machine tools, such as operation at relatively slow speeds to minimize such errors.

This invention is adapted to reduce or eliminate the dynamic errors in the operation of a motion control system, such as an automatic machine tool. This is accomplished in accordance with the invention by means of a control system which is adaptive or heuristic in the sense that the system detects and measures the dynamic error which occurs in a given cycle of operation and, utilizes the information to reduce the error during the succeeding cycle of operation. The invention, as set forth in the illustrative embodiment below, is especially adapted for use in the automatic control of machine tools by numerical control systems or by computer numerical control systems (sometimes referred to as soft wired numerical control). In such systems the command signals are provided in digital form and relative motion of the tool and workpiece is produced by a separate servo for each axis so that a cut path is generated by concurrent energization of the separate servos. Typically, the servos are of the analog type and a digital to analog conversion is required to develop the control signals for the servos. The command signals may represent absolute position or displacement, incremental position, or a second difference; in any case, however, the motion with respect to one axis is related to motion with respect to the other axis or axes, so as to define the desired path. Most commonly, the components of motion along the respective axes are related in time and the servo is, of course, time dependent to regulate the tool velocity. Such a system is disclosed and claimed in my U.S. Pat. No. 3,731,175 copending application, Ser. No. 232,078, filed Mar., 1972 for Servo System for Velocity and Position Control and assigned to the same assignee as the present invention.

Further, in accordance with the invention, method and apparatus are provided for reducing or eliminating dynamic errors in a motion control system. In general, this is accomplished by causing a controlled member to traverse a path in accordance with a given value of the desired motion, storing correction values corresponding to the difference between the desired motion and the actual motion at multiple points along the path, and then causing the member to make a successive excursion of the path with the value of the desired motion being changed in accordance with the stored correction values which were stored during the previous excursion. The path is suitably made up of plural successive increments and the actual motion is compared with the desired motion at successive intervals and the correction values which are stored are those which remain at the end of each given interval. The intervals may be measured in time or distance, for example, but in the preferred embodiment they are time intervals of equal duration. The correction value is preferably derived by producing an error value and modifying the same in accordance with a predetermined function, so as to obtain the maximum reduction of error during the successive excursion without creating instability in the control system. Additionally, the error value may be compared with a predetermined maximum allowable error value and an indication or alarm may be provided in the event of excessive errors.

The invention is especially adapted for use in motion control systems which utilize digital command signals generated by an interpolator or geometry calculator. The invention is carried out by supplying a command signal corresponding to the desired motion, generating an error signal corresponding to the difference between the desired motion and the actual motion of the member throughout a given interval, storing a correction signal corresponding to the error signal which remains at the end of the interval and algebraically adding the command signal and the correction signal which was stored for the corresponding interval during the previous excursion.

Further, in accordance with the invention, the motion control system is implemented in digital logic circuitry for processing the command signals from the interpolator to provide control signals for the servo. According to the invention the command signals from the interpolator may, if desired, be stored in memory and under control of a clock signal the command signal representing the desired path is applied through a first adder to the servo and through a second adder which also receives a feedback signal and develops an error signal corresponding to the difference between the digital motion and the actual motion of the controlled member. The error signal is applied to a third adder, in which it is algebraically summed with the last correction signal from a correction memory and the sum is stored in the correction memory as the next correction signal. A last correction signal for each interval is applied under the control of the clock signal to the other input of the first adder. The output of the first adder thus becomes a corrected command signal which is applied as the input signal to the servo.

A more complete understanding of the invention may be obtained from the detailed description which follows, taken with the accompanying drawings in which.

Figures 1, 2, 3:
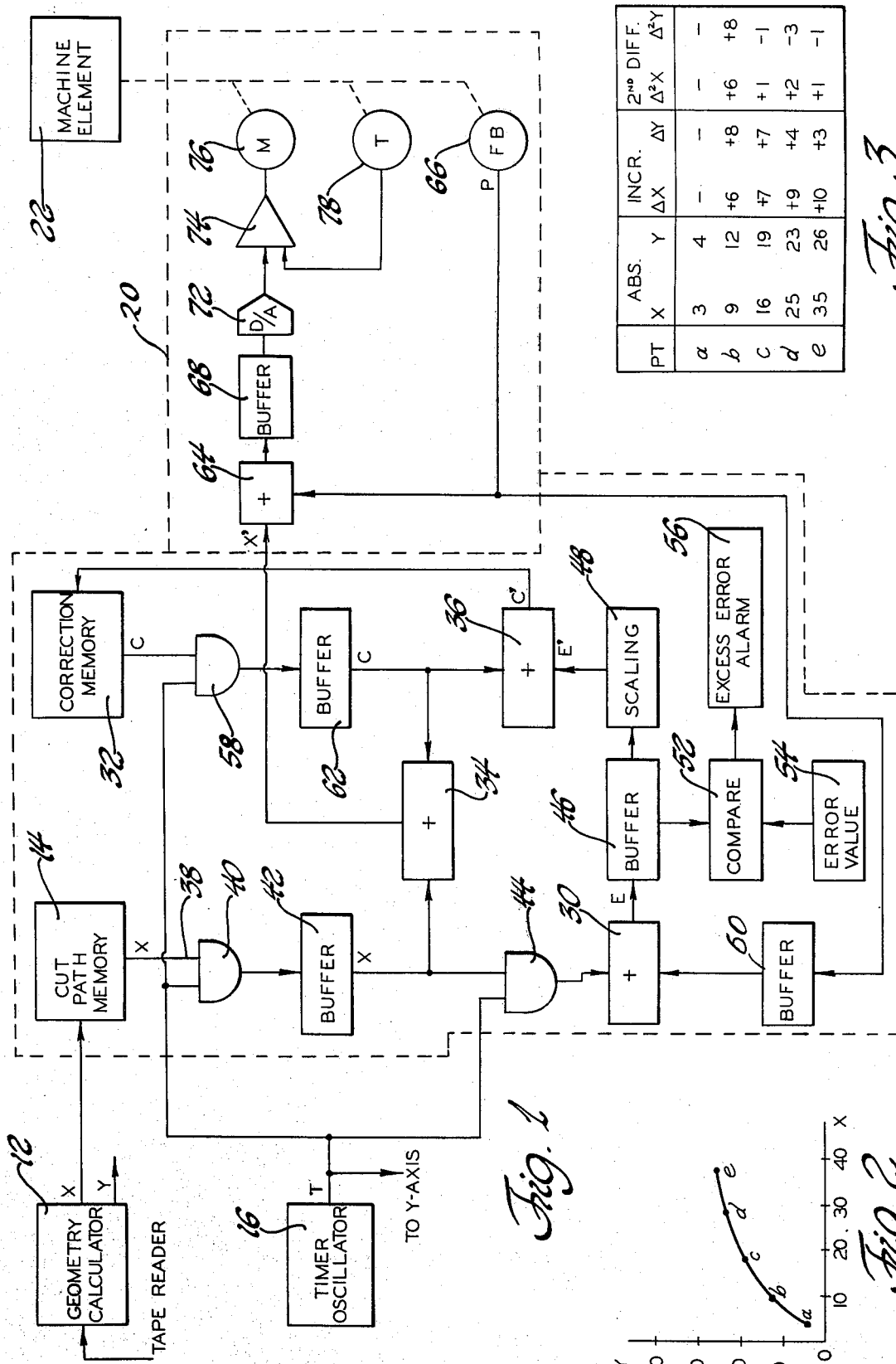
FIG. 1 is a block diagram of the adaptive control system of the subject invention.
FIG. 2 is a graphical representation of an example of a cut path.
FIG. 3 is a tabular representation of the points on a cut path.

Referring now to the drawings, there is shown an illustrative embodiment of the invention in an automatic control system of the type which is especially adapted for a numerical control of a contouring machine tool. The contouring machine tool may be of any conventional type, such as a milling machine or a grinder and may be of the multiple axis type. The invention is especially useful in a machine, for example, where the same part program is to be run several times for the purpose of producing several copies of the same part. In such an application the cutting tool is caused to traverse the cut path one time for each copy of the part and the multiple copies are produced by multiple passes or excursions of the cut path. The invention is also especially useful in precision grinding where a part program causes the tool to traverse the cut path through multiple excursions or passes in the production of a single part. In such applications of the invention the degree of accuracy is increased with each successive pass of the cutting tool, at least during the first few passes, after which the deviation of the cutting tool from the desired path is reduced to a minimal value by the self-corrective action of the adaptive system. In this manner machining of parts to a high degree of precision may be achieved under operating conditions which would ordinarily produce large dynamic errors. Thus, for example, a machine tool may be operated at exceedingly high speed or feedrate and yet the adaptive system, after the first few passes, will reduce or eliminate the dynamic error and the parts produced will exhibit dimensional accuracy which otherwise could be produced on the same machines only at much slower operating speeds.

The invention will be described with reference to a contouring machine tool of the multi-axis type, but for the sake of simplicity, only the control system for a single controlled axis is shown in the drawings. It will be understood that a separate adaptive correction system and a separate servo will be utilized for each separate controlled axis of the machine tool.

The initial input to the contol system for cutting a given workpiece is suitably in the form of a part program recorded on punched tape and read into the control system by a tape reader in a conventional manner. The input data may, for example, represent the contour of a part in two dimensions or with respect to two reference axes, and which may be made up of a succession of geometric shapes such as straight lines and circular arcs. This input data is supplied to a geometry calculator or interpolator 12 which converts the input data into a multiplicity of subpoints on the contour or desired path. An example of such a desired path is shown graphically with subpoints a through e in FIG. 2. The geometry calculations performed by the calculator or interpolator 12 identifies the positions of the subpoints in terms of a specified number of small increments of displacement along the respective axes of the coordinate system. The small increments of displacement may be of a resolution finer than that of the servo system and the response of the machine tool. The interpolator 12 produces command signals for each axis and the command signals for a given axis have a given value for each of the subpoints on the desired path. The absolute coordinates of the subpoints on the path are given in the first data column in the table of FIG. 3. It is to be noted at this point that the illustrative embodiment of the invention utilizes an absolute coordinate system, i.e. one in which the subpoints on the path are defined by $x$ and $y$ coordinates with reference to the origin of the coordinate axes. It is to be understood, however, that the command signals may take other forms, such as an incremental or first difference signals in which the subpoints are defined by $x$ and $y$ coordinate values which represent the displacement from the preceding subpoint. The desired path is represented by incremental data in the second data column of the table of FIG. 3. Also, the command signals may be in the form of second difference signals, i.e. the subpoints are defined by the difference between successive incremental coordinates of the subpoints. The desired path is represented by second difference data as shown in the third data column of the table of FIG. 3.

In the illustrative embodiment shown in FIG. 1, the calculator or interpolator 12 provides an $x$ axis command signal $X$ in the form of absolute coordinates of the subpoints on the desired path and it also provides a corresponding $y$ axis command signal $Y$. The command signals are suitably in digital form expressed as a binary number and the calculated points represented by the $x$ axis command signals for a complete cut path are transmitted to a binary memory 14 and stored for subsequent use. With the subpoints of the desired cut path all stored in the memory 14, the control system is in readiness for performing a first cycle of operation, i.e. the first pass or excursion of the cut path.

The adaptive control system receives input command signals X from the interpolator 12 under the control of the clock or timer oscillator 16 and develops a corrected command signal X' which is applied to the input of the servo 20 which produces the controlled motion of a movable element 22 of the machine tool. The adaptive control system also receives a feedback signal P indicative of the actual position of the machine element 22 and which is generated in a manner to be described subsequently.

The adaptive control system which, as stated above, develops the corrected command signal X' from the input command signal X comprises, in general, an adder 30 which compares the command signal X representing the desired position of the element 22 with the actual position thereof and develops an error signal E corresponding to the difference between such positions. The system also comprises a correction memory 32 which stores correction signals C which are algebraically combined in an adder 34 with the input command signals X to develop the corrected command signal X'. The correction signals stored in the memory 32 are termed the last correction signals C to distinguish them from the updated or next correction signals C' which are developed by the adder 36 which algebraically combines the error signal and the last correction signal. A more detailed description of the logic system will be given presently.

The command signals X stored in the memory 14 are in the form of binary numbers, each of which corresponds to the $x$ axis coordinate of a subpoint on the desired contour or cut path. The command signals X are supplied from the memory 14 under control of the timing signal T in sequence corresponding to the succession of subpoints on the desired path. The output of the memory 14 is connected through conductors 33 to the input of a gate circuit 40 which has its gate electrode connected with the timer oscillator 16 to receive the timing signal T. The output of the gate circuit 40 is applied to a buffer register 42 which holds the current command signal and which has an output connected to one input of the adder 34. The output of the buffer 42 is also connected to the signal input of a gate circuit 44 which has its gate input connected to the oscillator 16 to receive the timing signal T. The output of the gate circuit 44 is applied to one input of the comparator circuit 30 which receives at its other input the feedback signal P in a manner which will be described later. The adder 30 is operative to algebraically subtract the feedback signal P corresponding to the actual position of the machine element from the command signal X corresponding to the desired position and produce the error signal E which corresponds to the algebraic difference of the signals applied thereto. The output of the adder 30 is applied to a buffer register 46 which is operative to store the current error signal in binary form. The output of the buffer 46 is applied to the input of a scaling circuit 48 which is adapted to modify the error signal in accordance with a predetermined function to produce a scaled error signal E'. The predetermined function of the scaling circuit 48 is, for example, a constant multiplier having a numerical value of one-half but it will be appreciated that the function may be selected in accordance with the characteristics of the servo 20 and the machine tool being controlled.

The output of the buffer register 46 is also applied to one input of a comparator 52 which is adapted to detect the occurrence of excessive error, i.e. the difference between the actual and the desired position of the machine element 22. For this purpose a maximum allowable error value from a register 54 which is manually settable is applied to the other input of the comparator 52. The comparator is effective to develop an output signal when the input error signal exceeds the allowable error value. The output of the comparator 52 is applied to an alarm 56 which is suitably energized in the event of an excess error signal being applied.

Referring again to the scaling circuit 48, the output thereof which represents the scaled error signal E is applied to one input of the adder 36. The other input of the adder is supplied from the correction memory 32 and comprises the last correction signal C. For this purpose the output of the correction memory is applied to the signal input of a gate circuit 58 which has its gate input connected with the oscillator 16 to receive the timing signal T. The output of the gate circuit 58 is applied to a buffer register 62 which holds the last correction signal C and its output is connected to the other input of the adder 36 to apply the last correction signal C thereto. The adder 36 is operative to algebraically add the scaled error signal E' and the last correction signal C and produce the updated or next correction signal C' for the given control interval. The output of the adder 36 is applied to the input of the correction memory 32. It is to be noted that the correction memory stores a last correction signal C for every control interval or for every subpoint on the desired path and these correction signals are accessed from memory in timed sequence which corresponds to the succession of the subpoints on the desired path as it is traversed from beginning to end. Upon the occurrence of a clock signal T from the oscillator 16 the last correction signal for the given control interval is applied through the gate circuit 58 to the buffer 62 where it is held throughout the interval. During the same interval the next correction signal C' is being developed in the adder 36 and is applied to the input of the correction memory 32 and at the occurrence of the next timing signal from the timer oscillator 16 the next correction signal C' is stored in the memory location corresponding to the controlled interval, i.e. the last correction signal c is replaced by the next correction signal C'.

The last correction signal C for the given control interval is also supplied from the output of the buffer register 62 to the second input of the adder 34. The adder 34 is operative to algebraically add the command signal X applied to the first input and the correction signal C applied to the second input. The adder 34 thus develops the corrected command signal X' at its output which is connected with the servo 20.

The servo 20 is of conventional design and adapted to control the motion of the machine element 22 in accordance with a digital command signal. The servo comprises an adder 64 having one input connected with the output of the adder 34 and receiving the corrected command signal X'. The other input of the adder receives the feedback signal P which corresponds to the actual position of the machine element 22. The adder 64 is suitably a table adder and the command signal X' is in binary form. The feedback signal P is generated by a feedback transducer 66 of conventional type, such as a commutator pulse transducer or a digitized synchro. The transducer produces an output pulse for each incremental displacement of the machine element 22 and the pulse is of a polarity indicative of the direction of motion. Thus the feedback signal comprises a series of incremental displacement pulses. The adder 64 is operative to produce an output which indicates the instantaneous difference between the whole number of pulses represented by the corrected command signal X' and the whole number of pulses in the feedback signal P. The output of the adder is held by a buffer register 68 and represents in digital form the value of the difference between the pulses indicating actual position of the machine element 22 and the pulses representing the corrected command signal. The output of the register 68 is applied to the input of a digital to analog converter 72 to produce a velocity signal in analog form. The output of the converter 72 is applied to one input of the servo amplifier 74 which controls the energization of a servo motor 76 which is mechanically coupled, as indicated, to the machine element 22 for displacement thereof. A tachometer generator 78 is mechanically coupled to the servo motor 76 and generates a rate feedback signal which is applied to another input of the amplifier 74 for stabilization of the servo in a conventional manner. Accordingly, the servo 20 is operative in response to the corrected command signal X' to displace the machine element 22.

In operation, the inventive control system is adapted to develop a corrected command signal for each axis of control and will produce accuracy of motion as good as the servo will allow. Before describing the operation, it is noted that in conventional numerical control systems the motion of the machine tool does not exactly correspond with the command information because of non-linearities of the servo system and the dynamic characteristics of the machine tool. It is known, however, that machine tools exhibit a high degree of repeatability of response to given input command signals and consequently repeated execution of the same part program will result in substantially identical cut paths on the successive workpieces thus produced. The accuracy of repeatability may be many times that of the command accuracy due to the repeatability of the errors. This invention takes advantage of this attribute of machine tools and other such machines; although the actual path of the machine tool on the first pass does not correspond exactly to that prescribed by the input command signal the deviations are detected and a corrected command signal is developed on each succeeding pass which is effective to cause the cut path to correspond precisely with that which is represented by the initial input command.

The operation will be described with reference to the first and succeeding excursions of the cut path, i.e. the repeated execution of the same part program supplied by the tape reader 10. For explanatory purposes it may be considered that the machine tool is a milling machine operating with two controlled axes, namely, $x$ and $y$ axes to cut a two dimensional contour prescribed by the data in the part program. The milling machine may be used for production of a large number of copies of the same part and hence the same part program will be executed many times in succession to make multiple passes of the cutting tool so that each pass makes an additional piece.

In the first pass it will be assumed that the geometry calculations have been performed by the interpolator 12 and the command signals X are stored in the cut path memory 14 for the entire contour from beginning to end to be cut for the prescribed part. The clock or timer oscillator 16 is established at a frequency corresponding to the desired control interval. Upon the first timing signal the first value of the command signal X corresponding to the first control interval and to the first subpoint on the desired path is applied through the gate circuit 40 to the buffer 42. At the same time the command signal is applied through the gate circuit 44 to the adder 30. The command signal is applied from the buffer 42 to one input of the adder 34 and at the same time, under control of the timing signal, the last correction signal C is applied through the gate circuit 58 to the buffer 62 and thence to the other input of the adder 34. During this first pass the last correction signal C will have zero value for all control intervals and accordingly the adder 34 will produce a corrected command signal X' which is equal to the input command signal X. In response to the corrected command signal X' the servo 20 will displace the machine element 22 and the feedback signal P from the transducer 66 will be applied to the adder 64 in the servo and to the buffer 60 which is connected with the other input of the adder 30. Accordingly, the servo motor 76 is energized in accordance with the displacement velocity signal, i.e. the difference between the actual position of the machine element 22 and the desired position as represented by the corrected command signal X'. Also, the adder 30 develops the error signal E which corresponds to the difference between the actual position of the machine element 22 and the desired position indicated by the input command signal X. The error signal is held in the buffer 46 and if it should exceed the predetermined maximum error value applied from register 54, the comparator 52 will produce an output which energizes the alarm 56. Assuming, however, that the error is within acceptable limits, the error signal is applied through the scaling circuit 48 to develop the scaled error signal E' which is applied to the first input of the adder 36. At the same time, the last correction signal C from the buffer 62 is applied to the other input of the adder 36. Accordingly, the output of the adder 36, which represents the updated or next correction signal C' is applied to the input of the correction memory 32. In the first pass for all control intervals the value of the next correction signal C' is equal to the scaled error signal E' since the last correction signal C has a value of zero.

As previously stated, the adder 34 during the first pass for each control interval develops a corrected command signal X' which is equal to the input command signal X. Accordingly, the system advances under the control of the timing pulses from the timer oscillator 16 through the entire path with the operation for each succeeding control interval being the same as just described with reference to the first control interval and its corresponding value of command signal X. During the first pass the correction memory will be loaded with scaled correction signals C' and the value which is stored for each control interval is the remaining value at the end of the corresponding control interval i.e. that which remains when the timing signal for the succeeding control interval occurs.

On the second pass the operation will be similar to that just described for the first pass, except that the last correction signals C will have values for each control interval which are equal to the updated or next control signals C' which were developed during the first pass. Accordingly, in the second pass, the last correction signal C will be applied for each control interval from the buffer 62 to the input of the adder 34, where it is algebraically combined with the input command signal X for the control interval and the corrected command signal X' will differ from the command signal X to cause the servo 20 to position the machine element 22 according to that prescribed by the input command signal X, in spite of the dynamic errors introduced by the system. This operation is repeated for each control interval of the second pass and accordingly the accuracy of the second pass is greatly improved over that of the first pass. Additionally, updated or next control signals C' derived from the second pass, are stored in the correction memory 32 to be used as the last correction signals C during the third pass. The third pass and succeeding passes operate in the same manner as the second pass just described and the accuracy is enhanced with each succeeding pass until the limits of the servo system are reached.

It is noted that the embodiment described above may be modified by eliminating the cut path memory 14. In such modification the interpolator 12 continuously calculates the geometry for each subpoint on the path under control of the oscillator 16. Also, the embodiment described above assumes corrections are all made at a time T and are instantaneous in relation to desired position versus actual position. Other embodiments may make corrections in the correction memory in locations corresponding to earlier desired positions in order to predict servo response.

Although the description of this invention has been given with regard to particular embodiments it is not to be construed in a limiting sense. Many variations will now occur to those skilled in the art. For a definition of the invention reference is made to the appended claims.

I claim:
1. The method of reducing the deviation of a member from a desired path in plural successive excursions of the path, said path being made up of plural successive increments, said method comprising, for each successive increment of the path, the steps of; controlling the motion of the member during the excursion of a given interval in accordance with the value of the desired motion, measuring during each one of the plural successive excursions of said given interval the difference between the desired motion and the actual motion, storing at the end of each excursion of the given interval a correction value corresponding to the difference between the desired motion and the actual motion for the given interval, and correcting the value of the desired motion for the next excursion of the given interval in accordance with the stored correction value which was stored for the given interval during the previous excursion of said given interval by said member, said method also comprising, for each excursion of said path, the step of repeating the aforesaid steps thereby updating the correction values on each path excursion.

2. The invention as defined in claim 1 including the step of producing an error value corresponding to the difference between the desired motion and the actual motion and wherein the step of storing a correction value is performed by storing a value corresponding to the error value which remains at the end of the given interval.

3. The invention as defined in claim 2 including the step of modifying said error value in accordance with a predetermined function whereby said correction value is different from said error value.

4. The invention as defined in claim 2 including the step of comparing said error value with a predetermined maximum allowable error value and causing a signal if the former exceeds the latter.

5. The method of reducing the deviation of a member from a desired path in plural successive excursions of the path, said path being made up of plural successive increments, said method comprising, for each successive increment of the path, the steps of; generating a command signal corresponding to the motion of the member which is desired to be executed during the excursion of a given interval, moving said member in response to the command signal, continuously generating during each one of the plural successive excursions of said given interval an error signal corresponding to the difference between the command signal representing the desired motion and a feedback signal representing the actual motion of the member throughout said interval, storing a correction signal corresponding to the error signal which remains at the end of each excursion of said given interval, and algebraically adding the command signal for the given interval to the last correction signal which was stored for the same interval during the previous excursion of said member.

6. The invention as defined in claim 5 including the step of initiating successive intervals after equal time periods.

7. The invention as defined in claim 6 including the step of storing the command signals for each increment of said path before the movement of said member is initiated and then initiating successive intervals after the lapse of equal time periods.

8. The invention as defined in claim 7 including the step of modifying said error signal in accordance with a predetermined function which results in a correction signal less than said error signal.

9. The invention as defined in claim 8 including the step of comparing said error signal with a predetermined maximum allowable error value and producing an indication when the error signal exceeds the error value.

10. The invention as defined in claim 6 including the steps of generating a feedback signal corresponding to the actual motion of the member during said interval, algebraically combining said feedback signal with said command signal to produce said error signal.

11. The invention as defined in claim 10 wherein said step of moving said member is performed in accordance with the value of the algebraic summation of said command signal and said last correction signal.

12. Apparatus for reducing the deviation of a controlled member from a desired path in successive excursions of the path, said path being made up of plural successive increments, said apparatus comprising means for generating a command signals corresponding to the desired successive increments of motion of said member, servo means for moving said member in response to a control signal, last correction signal storage means, first adding means having one input connected to the said command signal generating means and another input connected with said correction signal storage means and having an output connected with the input of said servo means, feedback signal generating means connected with said servo means for producing a signal corresponding to the actual position of said member, second adding means having one input connected with said feedback signal generating means and another input connected with said command signal generating means and being adapted to develop an error signal corresponding to the difference of said inputs, third adding means having one input connected with the output of said second adding means and another input connected with the output of said correction signal storage means for algebraically combining said inputs to develop a next correction signal, the output of said third adding means being connected with the input of said correction signal storage means, timing means connected with the output of said command signal generating means and the output of said storage means, said timing means being adapted to apply succeeding values of said command signals and said correction signals to said first and third adding means respectively during successive time intervals whereby the output of said first adding means applies the algebraic sum of the command signal and the last correction signal to said servo means, and whereby a next correction signal is developed by said third adding means and applied to said storage means for each interval to be used as the last correction signals for the respective intervals during the next excursion of said path.

13. The invention as defined in claim 12 wherein said means for generating command signals comprises an interpolator and a cut path memory.

14. The invention as defined in claim 12 including means for storing a value corresponding to a maximum allowable error value, comparator means connected with the last mentioned means and said third adder, and alarm means connected with said comparator.

15. The invention as defined in claim 13 including first gate means connected between said cut path memory and one input of said first and second adders, and second gate means connected between said correction memory and one input of said third adder, said timing means being connected to said first and second gate means.

* * * * *

UNITED STATES PATENT OFFICE
CERTIFICATE OF CORRECTION

Patent No. 3,911,347  Dated October 7, 1975

Inventor(s) Dudley B. Hartung

It is certified that error appears in the above-identified patent and that said Letters Patent are hereby corrected as shown below:

On cover page "Continuation of Ser. No. 236,239, March 20, 1972" should be --Continuation of Ser. No. 236,389, March 20, 1972--.

Column 1, line 4, "236,239, filed March 20, 1972." should be --236,389, filed March 20, 1972.--.

Column 5, line 34 (Specification page 9, line 7) "33" should be --38--.

Column 6, line 10, (Specification page 10, line 14) "E" should be --E'--.

Signed and Sealed this twenty-fourth Day of February 1976

[SEAL]

Attest:

RUTH C. MASON
Attesting Officer

C. MARSHALL DANN
Commissioner of Patents and Trademarks